F. R. WILLSON.
VEHICLE WHEEL.
APPLICATION FILED MAR. 12, 1917.
1,255,262.
Patented Feb. 5, 1918.
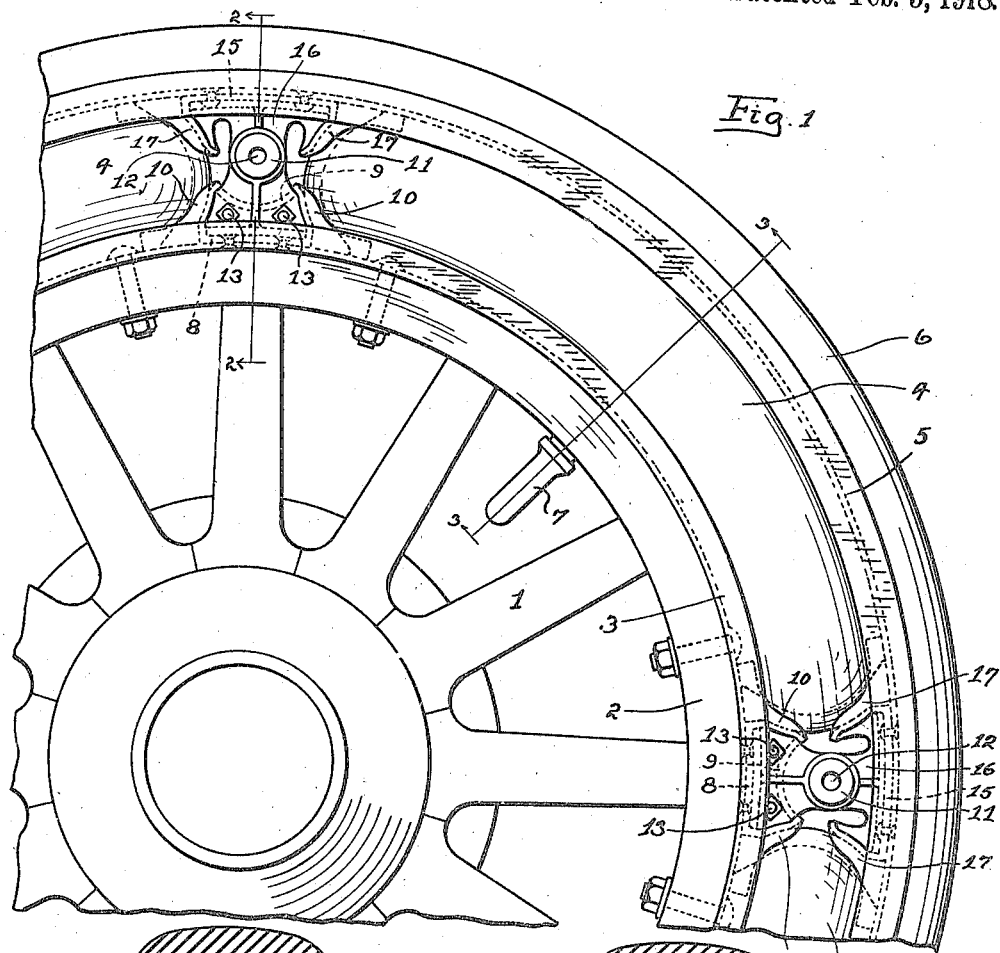
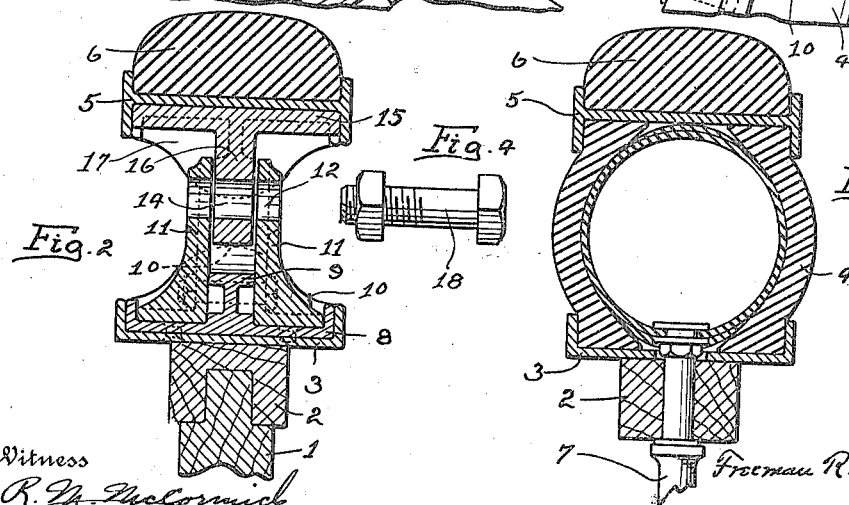
Witness
R. M. McCormick
A. L. Phelps
Inventor
Freeman R. Willson
By
C. C. Shepherd  Attorney

UNITED STATES PATENT OFFICE.

FREEMAN R. WILLSON, OF WORTHINGTON, OHIO.

VEHICLE-WHEEL.

1,255,262.  Specification of Letters Patent.  Patented Feb. 5, 1918.

Application filed March 12, 1917. Serial No. 154,078.

*To all whom it may concern:*

Be it known that I, FREEMAN R. WILLSON, a citizen of the United States, residing at Worthington, in the county of Franklin and State of Ohio, have invented certain new and useful Improvements in Vehicle-Wheels, of which the following is a specification.

This invention relates to vehicle wheels and is particularly directed to the provision of a pneumatically cushioned wheel wherein the pneumatic cushion does not come into actual contact with the roadway. By this arrangement, I resort to the combination of a pneumatic cushion and, preferably, a solid rubber tire or tread portion.

One object of this invention resides in locating a plurality of pneumatic cushions between the inner and outer rims forming a portion of my wheel structure and bringing additional means into play for engaging the ends of these pneumatic cushions to rotatably cushion the outer rim or, what is in effect the same, to cushion the transmission mechanism. By this arrangement, should the transmission mechanism of the motor vehicle be suddenly thrown into gear, there is a slight rotative cushioning between the two ends, which has the effect of lessening the shock upon the transmission mechanism.

A further object of my invention resides in the means whereby the inner and outer rim members may have a relative movement toward and away from each other in cushioning the vehicle in a vertical direction, this means also taking the form of assuming the side thrust to prevent the wheel from collapsing due to such side thrust.

I also aim to so construct the structure for permitting this vertical cushioning so that the inner and outer rims may be rigidly connected with each other to maintain the stability of the wheel should one or more of the pneumatic cushions become deflated. This mechanism is, therefore, an emergency structure to be used only in case of deflation of the pneumatic cushions.

The preferred embodiment of my invention is shown in the accompanying sheet of drawings, in which similar characters of reference designate corresponding parts, and in which:

Figure 1 is a side view showing approximately one-quarter of a wheel embodying my improvements, Fig. 2 is a transverse section taken on line 2—2 of Fig. 1, Fig. 3 is a transverse section taken on line 3—3 of Fig. 1, and;

Fig. 4 is a view in side elevation of one of the bolts used by me for rigidly connecting the inner and outer rims.

The hub and spoke portion is designated generally by the reference numeral 1, the spokes being secured into the felly 2 in the usual manner. To this felly, there is secured a channel member or ring member 3, which serves as the base into which the inner portion of each of the pneumatic cushions 4 comprising inner tubes and outer casings is secured. The outer edges of these casings are secured in somewhat of a like manner to a double channel member 5, the downwardly projecting legs of this double channel member serving to form the means for securing the cushions 4 in position and the upwardly projecting legs serving to hold the solid tire tread portion 6 in position. It will be understood that the wheel may be constructed with any desired number of pneumatic cushions, whose casings are provided with rounded ends and which are open at their tops and bottoms as the number of these forms no portion of the present invention. In Fig. 1, the structure is so proportioned that four of these pneumatic cushions are utilized, each being provided with the usual type of valve 7 by means of which the section may be inflated.

Located between the ends of each pair of cushion sections is the means for maintaining lateral stability of the wheel, which means in each case comprise a base supporting piece 8 secured to the inner channel member 3. Each base piece is provided with a central concaved web 9, as is shown, which serves to limit the up and down movement of the outer rim portion of the wheel, as will be presently described, while the ends of each of the base pieces are provided with a saddle portion 10 shaped to embrace the rounded ends of each of the pneumatic sections 4, as shown. Located on each side of the central enlarged portion 9 is a pair of spaced guides 11, each guide being provided with an aperture 12 in its upper end and each pair of guides being in turn rigidly connected to the base piece by means of the bolts 13. The guides abut against the sides of the enlarged portion 9 and when rigidly fastened together, this enlarged portion forms the means for holding them properly spaced. The apertures 12 are arranged to be in transverse alinement with each other and also in transverse alinement with a corresponding aperture 14 in a single guide member 15 provided for each set and shown as being carried by the outer rim 5. The apertures 12 and 14 are designed to be in alinement when the two rims are centrally arranged for a purpose to be presently described. The head piece 16 of each of the upper guides is of a width to slidably fit the space between the upstanding guides 11 and when mounted in this position, the combined guides serve the purpose of maintaining lateral stability of the wheel, although permitting the free up and down movement relatively of the two rims. The upper guide of each set is also provided with a pair of saddle portions 17 shaped similarly to the saddle portions 10 and also designed to embrace the ends of the pneumatic cushions.

When the driving mechanism is suddenly thrown into gear, the vehicle is made to give a sudden start. This action may be cushioned slightly by means of certain of the saddles 10 and 17 in their bearing engagement with the ends of the pneumatic cushions. In this manner, the transmission mechanism is slightly cushioned and the wheel allowed a certain amount of relative rotative movement. When the wheel rides an obstruction, one portion of the outer rim moves toward the inner rim and the other portion of the outer rim moves away from the inner rim. This action is permitted because of the slidable connection between the guides 11 and 15 and inasmuch as the head 16 of the guide 15 is disposed between the spaced guides 11, the wheel is prevented from collapsing due to lateral thrust. Should one or all of the pneumatic cushions 4 become deflated, the wheel may still be maintained in use by inserting the pins or bolts 18 through the alining apertures 12 and 14. This establishes a rigid connection between the inner and outer rim, but allows the wheel to remain operative. It will, of course, be understood that the pneumatic cushion effect is removed in this manner, but this arrangement prevents the collapsing of the wheel and allows the user to proceed to the end of his journey.

What I claim, is:

1. A vehicle wheel comprising an inner rim, an outer rim, a plurality of pneumatic cushion sections between and supported directly upon said two rims, a plurality of sets of interlocking guide members located between the ends of pairs of said cushion sections and between said rims to guide them in their relative cushioning movement toward and away from each other, and saddle portions for embracing the ends of said sections as a rotative cushion.

2. A vehicle wheel comprising an inner rim, an outer rim, a plurality of pneumatic cushion sections between and supported directly upon said two rims, a plurality of sets of interlocking guide members located between the ends of pairs of said cushion sections and between said two rims to guide them in their relative cushioning movement toward and away from each other, and means for rigidly locking the separable members of each set together to prevent relative movement between rims in case said sections are deflected.

3. A vehicle wheel comprising an inner rim, an outer rim, a plurality of pneumatic cushion sections between and supported directly upon said two rims, a plurality of sets of interlocking guide members located between the ends of said cushion sections and between said two rims to guide them in their relative cushioning movement toward and away from each other, the separable members of each set having transverse alining apertures, and pins to pass through said alining apertures to lock said members together to prevent relative movements between rims in case said sections are deflected.

4. A vehicle wheel comprising an inner rim, an outer rim, a plurality of pneumatic cushion sections between and supported directly upon said two rims, a guide supporting member located between each pair of sections and carried by one of said rims, saddle portions on each supporting member for embracing the ends of said sections, a plurality of pairs of spaced guides on said supporting member, a plurality of complemental guides carried by the other rim and arranged to slide between said spaced guides, the guides of each set having transversely alining apertures, embracing saddles also carried by said complemental guides, and pins adapted to pass through said apertures to prevent relative movement between said rims in case said sections are deflected.

5. A vehicle wheel comprising an inner rim, an outer rim, and a plurality of pneumatic cushion sections located between said two rims, said cushion sections comprising outer casing members of endless form in a direction at right angles to the plane of the wheel, but open at their top and bottom sides, and pneumatic inner tubes located within said casings.

6. A vehicle wheel comprising an inner rim, an outer rim, a plurality of pneumatic cushion sections between said two rims, each cushion section comprising a casing endless in a direction at right angles to the plane of the wheel and having side walls connected by rounded ends, said casing being open at its top and bottom sides, and a pneumatic inner tube located within each casing.

In testimony whereof I affix my signature in presence of two witnesses.

FREEMAN R. WILLSON.

Witnesses:
H. H. SPAIN,
A. L. PHELPS.

Copies of this patent may be obtained for five cents each, by addressing the "Commissioner of Patents, Washington, D. C."